US006201720B1

(12) United States Patent
Tracy et al.

(10) Patent No.: US 6,201,720 B1
(45) Date of Patent: Mar. 13, 2001

(54) APPARATUS AND METHODS FOR SPACE-VECTOR DOMAIN CONTROL IN UNINTERRUPTIBLE POWER SUPPLIES

(75) Inventors: John G. Tracy, Raleigh, NC (US); Edward Akbari, Etobicoke (CA); Miguel E. Chavez, Raleigh; Frederick Tassitino, Jr., Wake Forest, both of NC (US)

(73) Assignee: Powerware Corporation, Raleigh, NC (US)

( * ) Notice: Subject to any disclaimer, the term of this patent is extended or adjusted under 35 U.S.C. 154(b) by 0 days.

(21) Appl. No.: 09/507,021

(22) Filed: Feb. 18, 2000

(51) Int. Cl.$^7$ ..................................................... H02M 7/44
(52) U.S. Cl. ............................................. 363/95; 363/131
(58) Field of Search .................................. 363/95, 97, 98, 363/131, 132, 56, 40, 41

(56) References Cited

U.S. PATENT DOCUMENTS

| | | | |
|---|---|---|---|
| 4,159,513 | * 6/1979 | Gemp et al. | 363/43 |
| 4,792,742 | 12/1988 | Fujimoto et al. | 318/805 |
| 5,191,519 | 3/1993 | Kawakami | 363/71 |
| 5,559,419 | * 9/1996 | Jansen et al. | 318/808 |
| 5,574,636 | 11/1996 | Lee et al. | 363/132 |
| 5,717,584 | * 2/1998 | Rajashekara et al. | 363/98 |
| 5,847,944 | 12/1998 | Jang et al. | 363/44 |
| 5,910,892 | 6/1999 | Lyons et al. | 363/98 |
| 5,936,856 | 8/1999 | Xiang | 363/98 |
| 5,949,664 | 9/1999 | Bernet et al. | 363/37 |
| 5,955,863 | 9/1999 | Iwashita et al. | 318/812 |
| 5,994,867 | 11/1999 | Birk et al. | 318/609 |
| 6,005,783 | * 12/1999 | Xue et al. | 363/36 |
| 6,014,017 | * 1/2000 | Weinhold et al. | 323/207 |

OTHER PUBLICATIONS

Tzou, Ying–Yu, "FPGA Realization of Space–Vector PWM Control IC for Three–Phase PWM Inverters," IEEE Transactions on Power Electronics, vol. 12, No. 6, Nov. 1997, pp. 953–963.

(List continued on next page.)

Primary Examiner—Adolf Deneke Berhane
(74) Attorney, Agent, or Firm—Myers Bigel Sibley & Sajovec

(57) ABSTRACT

Uninterruptible power supplies (UPSs), power conversion apparatus and power conversion methods are provided which may improve phase regulation of polyphase AC voltages in the presence of load imbalances. According to one embodiment, a UPS includes a DC voltage generating circuit that produces a DC voltage. A space vector domain controlled inverter couples the DC voltage generating circuit to an AC load, and produces a polyphase AC output voltage at the load by sensing a plurality of voltages at the load, transforming the plurality of sensed voltages according to a space vector (d-q) transformation to produce an output space vector, generating an error space vector from the output space vector and a reference space vector, and selectively coupling the DC voltage generating circuit to the load responsive to the error space vector. In this manner, a voltage control loop is closed in the d-q domain, which may improve per-phase regulation of the polyphase AC output. Preferably, compensation is applied to the error space vector to produce a control space vector that compensates for poles or other transfer characteristics of the forward path of the voltage control loop. In another embodiment, the reference space vector is generated by an outer voltage amplitude loop that compares a sum of the plurality of output voltages at the load to a reference voltage amplitude, generating an error amplitude voltage which is compensated and then transformed according to a space vector transformation to produce the reference space vector that serves as the set point for the inner space vector domain control loop.

32 Claims, 6 Drawing Sheets

OTHER PUBLICATIONS

Yu et al., "AC Induction Motor Control Using Constant V/Hz Principle and Space Vector PWM Technique with TMS320C240, Application Report: SPRA284A," Texas Instruments, DSP Digital Control System Applications, Digital Signal Processing Solutions, Apr. 1998 pp1–53.

Stefanovic et al., "Space–Vector PWM Voltage Control with Optimized Switching Strategy," Conference Record of the IEEE Industry Applications Society Annual Meeting, vol. I, pp. 1025–1033 No date.

Hava et al. "Carrier–Based PWM–VSI Overmodulation Strategies: Analysis, Comparison, and Design," IEEE Transactions on Power Electronics, vol. 13, No. 4, Jul. 1998, pp. 674–689.

Vlatkovic et al., "Digital–Signal–Processor–Based Control of Three–Phase Space Vector Modulated Converters," IEEE Transactions on Industrial Electronics, vol. 41, No. 3, Jun. 1994, pp. 326–332.

Habetler, "A Space Vector–Based Rectifier Regulator for AC/DC/AC Converters," IEEE Transactions on Power Electronics, vol. 8, No. 1, Jan. 1993, pp. 30–36.

Holtz, "Pulsewidth Modulation—A Survey," IEEE Transactions on Industrial Electronics, vol. 39, No. 5, Dec. 1992, pp. 410–420.

Van Der Broeck et al., "Analysis and Realization of a Pulsewidth Modulator Based on Voltage Space Vectors," IEEE Transactions on Industry Applications, vol. 24, No. 1, Jan./Feb. 1988, pp. 142–150.

Prasad, "Analysis and Comparison of Space Vector Modulation Schemes for Three–Leg and Four–Leg Voltage Source Inverters,"Thesis submitted to Virginia Polytechnic Institute and State University, Blacksburg, Virginia, May 15, 1997, 68 pages.

* cited by examiner

APPARATUS AND METHODS FOR SPACE-VECTOR DOMAIN CONTROL IN UNINTERRUPTIBLE POWER SUPPLIES

BACKGROUND OF THE INVENTION

The present invention relates to power conversion apparatus and methods, and more particularly, to apparatus and methods for producing polyphase alternating current (AC) power from a direct current (DC) source in apparatus such as uninterruptible power supplies (UPS). UPSs are power conversion devices that are commonly used to provide conditioned, reliable power for computer networks, telecommunications networks, medical equipment and the like. UPSs are widely used with computers and telecommunications devices, including but not limited to personal computers, workstations, mini computers, network servers, routers, switches, disk arrays and mainframe computers, to insure that valuable data is not lost and that the device can continue to operate notwithstanding temporary loss of an AC utility source. UPSs typically provide power to such electronic equipment from a secondary source, such as a battery, in the event that a primary alternating current (AC) utility source drops out (blackout) or fails to provide a proper voltage (brownout).

Referring to FIG. 1, a conventional pulse width modulated (PWM) polyphase (e.g., three-phase) UPS generates a polyphase AC output at a load 20 from a DC voltage $V_{DC}$ generated between positive and negative voltage rails by a DC voltage generating circuit 10. Depending on the configuration of the UPS, the DC voltage $V_{DC}$ may be generated in a number of different ways. For example, the DC voltage $V_{DC}$ may be directly generated by battery or, as shown, by DC/DC conversion of a lower battery voltage $V_B$ generated by a battery 12. In some configurations, the DC voltage $V_{DC}$ may be generated from an AC source, or from a combination of an AC source and a DC source. The DC voltage $V_{DC}$ is inverted by a polyphase PWM inverter circuit 30, which typically includes a plurality of switches (e.g., transistors) that are selectively operated to synthesize AC voltage waveforms from the DC voltage $V_{DC}$. Additional filtering may be provided to reduce harmonics generated by the switching operations.

In order to improve control of such PWM inverter circuits, so-called "space vector modulation" (SVM) techniques have recently been introduced. SVM techniques are commonly used in polyphase induction motor control applications, and typically involve transforming a "reference" voltage vector to a vector in a "d-q" or "space vector" coordinate domain, which is in turn used to generate a PWM switching pattern. In a closed loop motor control application, for example, the reference voltage may be a control voltage derived from an error voltage generated by a speed or voltage control loop. The vector produced by the space vector (d-q) transformation is mapped to various logical values of switching signals applied to the switching devices of a PWM inverter circuit based on its orientation in the d-q plane. A variety of mappings may be utilized, as described, for example, in the article by Hava et al. entitled "Carrier-Based PWM-VSI Overmodulation Strategies: Analysis, Comparison and Design,"*IEEE Trans. on Power Electronics*, Vol. 13, No. 4, pp. 674–689 (July 1998).

UPS's are often used to serve unbalanced polyphase loads, particularly in large-scale operations in which a single high-capacity UPS may be used to provide power to a variety of single-phase loads connected to individual phases. Although loads may be configured with a view toward minimizing phase imbalance, practical constraints in load location and use often result in significant load imbalances. Accordingly, it is generally desirable to compensate for imbalances in the loads presented to the phases of a UPS. Unfortunately, however, conventional polyphase UPS control schemes often provide poor regulation of individual phases.

SUMMARY OF THE INVENTION

According to embodiments of the present invention, UPSs, power conversion apparatus and power conversion methods are provided which may improve phase regulation of polyphase AC voltages in the presence of load imbalances. According to one embodiment of the present invention, a UPS includes a DC voltage generating circuit that produces a DC voltage. A space vector domain controlled inverter couples the DC voltage generating circuit to an AC load, and produces a polyphase AC output voltage at the load by sensing a plurality of voltages at the load, transforming the plurality of sensed voltages according to a space vector (d-q) transformation to produce an output space vector, generating an error space vector from the output space vector and a reference space vector, and selectively coupling the DC voltage generating circuit to the load responsive to the error space vector. In this manner, a voltage control loop is closed in the d-q domain, which may improve per-phase regulation of the polyphase AC output. Preferably, compensation is applied to the error space vector to produce a command space vector that compensates for poles or other transfer characteristics of the forward path of the voltage control loop. In an embodiment of the present invention, the reference space vector is generated by an outer voltage amplitude loop that compares a sum of the plurality of output voltages at the load to a reference voltage amplitude, generating an error amplitude voltage which is compensated and then transformed according to a space vector transformation to produce the reference space vector that serves as the set point for the inner, space vector domain control loop.

In particular, according to one embodiment of the present invention, an uninterruptible power supply (UPS) for supplying a polyphase AC output at a load includes a DC voltage generator that produces a DC voltage. A voltage sensor is configured to connect to the load and detects a plurality of output voltages at the load. A space vector domain controlled inverter is coupled to the voltage sensor and to the DC voltage generator and configured to connect to the load. The space vector domain controller inverter transforms the detected plurality of output voltages according to a space vector transformation to generate an output space vector corresponding to the detected plurality of output voltages. The space vector domain controlled inverter generates an error space vector from the output space vector and a reference space vector, and selectively couples the DC voltage generator to the load responsive to the error space vector.

In another embodiment of the present invention, the space vector domain controlled inverter comprises a space vector domain controller that transforms the detected plurality of output voltages according to a space vector transformation to estimate an output space vector corresponding to the detected plurality of output voltages. The space vector domain controller generates an error space vector from the output space vector and a reference space vector, and that generates a switching command signal responsive to the error space vector. A polyphase inverter circuit is coupled to the space vector domain controller and to the DC voltage generator and configured to connect to the load, and selectively couples the DC voltage generator to the load responsive to the generated switching command signal. Preferably, the space vector domain controller compensates the error space vector to generate a command space vector and generates the switching command signal responsive to the command space vector.

An output filter may be configured to couple the polyphase inverter circuit to the load. In one embodiment of the present invention, the output filter includes a transformer having first winding connected to the polyphase inverter circuit and a second winding configured to connect to the load. The voltage sensor detects a plurality of voltages produced at the second winding of the transformer. The space vector domain controller transforms the detected plurality of output voltages produced at the second winding of the transformer according to a space vector transformation that compensates for at least one of a phase and magnitude transformation imposed by the transformer. The polyphase inverter circuit is operative to selectively couple the DC voltage generator to the primary winding of the transformer responsive to the switching command signal generated by the space vector domain controller.

According to another aspect of the present invention, the space vector domain controller transforms the detected plurality of output voltages according to a first space vector transformation. The space vector domain controller generates a voltage amplitude error from the detected plurality of output voltages and a reference voltage amplitude, compensates the voltage amplitude error to produce a command voltage amplitude and transforms the command voltage amplitude according to a second space vector transformation to produce the reference space vector. The space vector domain controller preferably sums the detected plurality of output voltages to produce an output voltage amplitude and subtracts the output voltage amplitude from the reference voltage amplitude to generate the voltage amplitude error.

According to method aspects of the present invention, a voltage at a polyphase AC load is regulated by detecting a plurality of output voltages at the load and transforming the detected plurality of output voltages according to a space vector transformation to estimate an output space vector corresponding to the detected plurality of output voltages. An error space vector is generated from the output space vector and a reference space vector. A DC source is selectively coupled to the load responsive to the error space vector. The error space vector is preferably compensated to generate a command space vector, and the DC source is selectively coupled to the load responsive to the command space vector.

DETAILED DESCRIPTION

Figure 1:
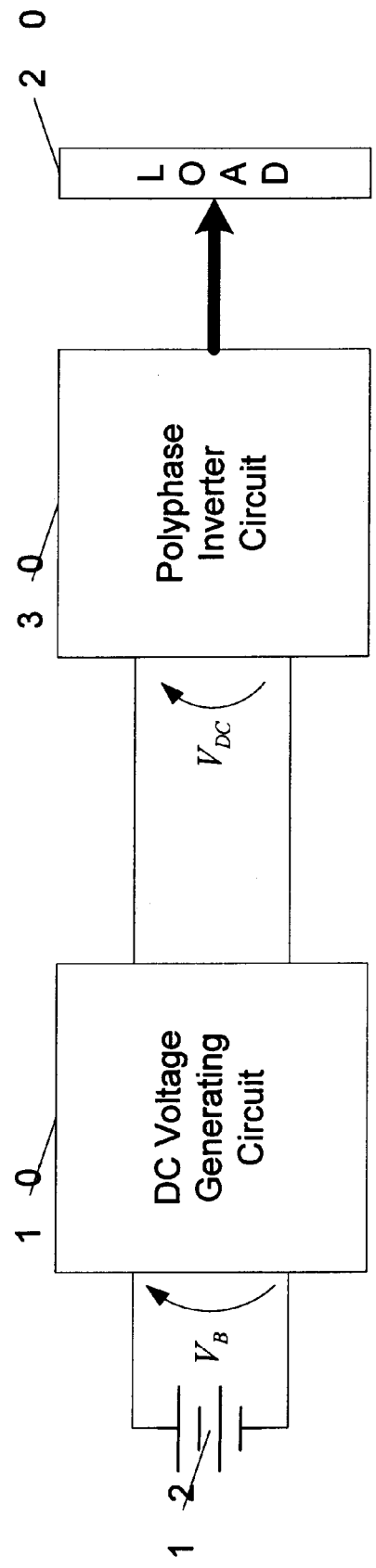
FIG. 1 illustrates an uninterruptible power supply (UPS) according to the prior art.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 2:
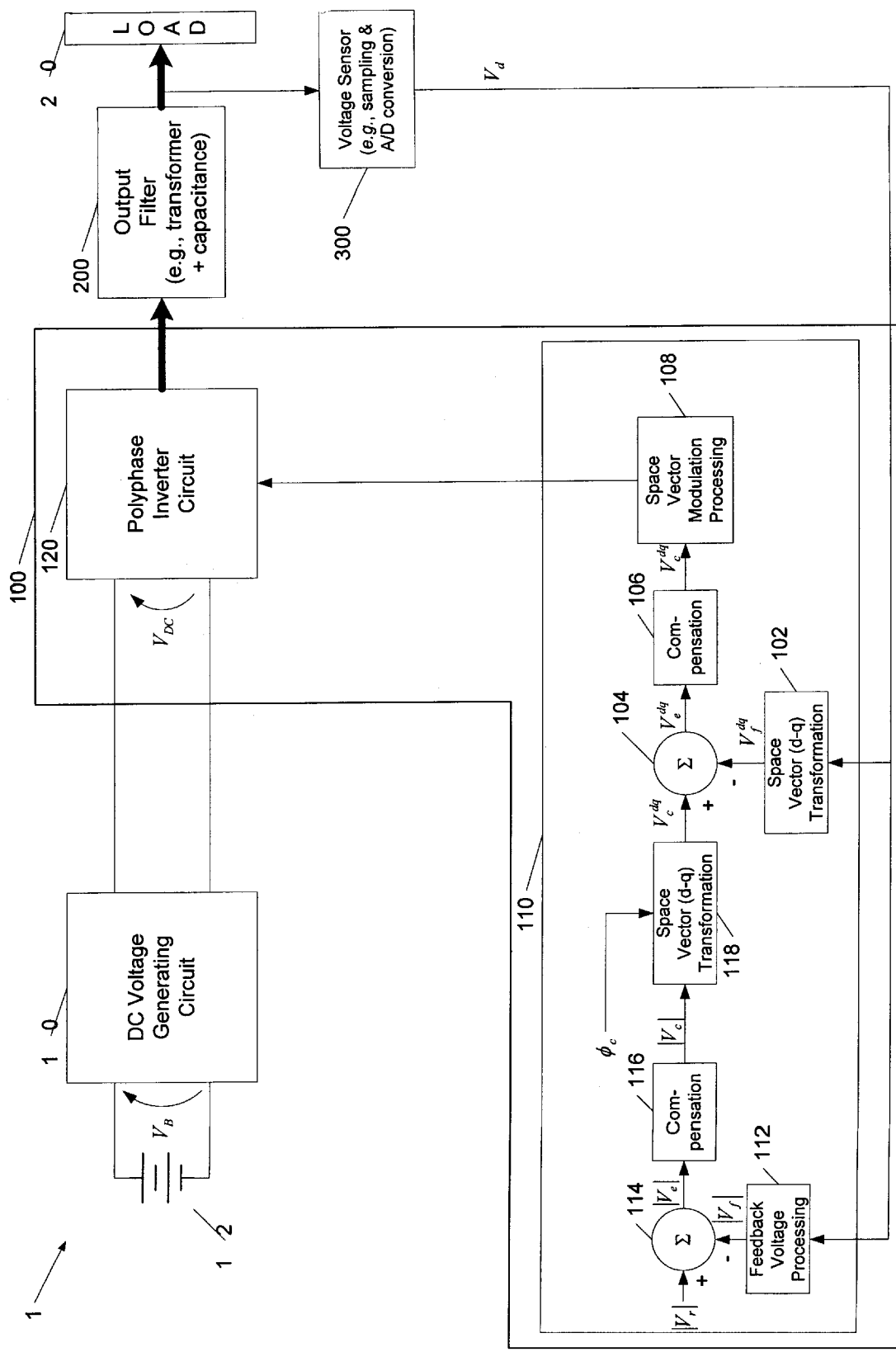
FIG. 2 illustrates a UPS according to an embodiment of the present invention.

FIG. 2 illustrates an uninterruptible power supply (UPS) 1 according to an embodiment of the present invention. The UPS 1 includes a DC voltage generating circuit 10 that produces a DC voltage $V_{DC}$ and a space vector domain controlled inverter 100 that produces a polyphase (e.g., three phase) AC output to a load 20 from the DC voltage $V_{DC}$ responsive to voltages (e.g., line to neutral voltages) sensed at the load 20 by a voltage sensor 300. The space vector domain controlled inverter 100 includes a polyphase inverter circuit 120 that is responsive to one or more switching control signals produced by a space vector domain controller 110, providing the polyphase AC output to the load 20 via an output filter 200, for example, a filtering circuit including passive elements such as transformers, inductors and capacitors.

As shown, the DC voltage generating circuit 10 produces the DC voltage $V_{DC}$ from a battery 12. For example, the DC voltage generating circuit 10 may include a DC/DC converter circuit (not shown) that is operative to produce the DC voltage $V_{DC}$ from a DC voltage $V_B$ produced by the battery 12. It will be appreciated, however, that the DC voltage generating circuit 10 may have any one of a variety of forms other than that illustrated in FIG. 2. The DC voltage $V_{DC}$ may be generated directly from a battery and/or from a source other than a battery, such as from an AC source. For example, in an "off-line" configuration, the UPS 1 may be configured such that the DC voltage $V_{DC}$ is generated solely from a battery, with an AC source being configured to connect to the load 20 via a transfer switch (not shown) or similar arrangement. Alternatively, in an "on-line" configuration, the UPS 1 may be configured such that the DC voltage generating circuit 10 generates the DC voltage $V_{DC}$ from a DC source and/or an AC source.

As shown, the space vector domain controlled inverter 100 has a nested loop structure, including an inner, space vector domain control loop 101, around which a lower-bandwidth voltage amplitude loop 103 is closed. Referring to the inner control loop 101, digital values $V_d$ corresponding to voltages (e.g., line to neutral or line to line voltages) sensed by the voltage sensor 300 are processed by a space vector transformation circuit 102 that transforms the digital voltage values $V_d$ into coordinate values of an output space vector $V_f^{dq}$ corresponding to the polyphase AC output in a space vector (d-q) domain. The output space vector $V_f^{dg}$ is subtracted from a reference space vector $V_r^{dq}$ in a summing circuit 104. The resulting error space vector $V_e^{dq}$ is then compensated (e.g., filtered and/or limited) in a compensation circuit 106, producing a command space vector $V_c^{dq}$. The command space vector $V_c^{dq}$ is then processed by a space vector modulation processing circuit 108 to produce one or more switching control signals for the polyphase inverter circuit 120.

The outer loop 103 includes a voltage processing circuit 112 that sums the digital voltage $V_d$ values produced by the voltage sensor 300. The resulting output voltage amplitude $|V_f|$ is then subtracted from a reference voltage amplitude $|V_r|$ in a summing circuit 114, producing a voltage amplitude error $|V_e|$. The voltage amplitude error $|V_e|$ is then compensated (e.g., filtered and/or limited) in a compensation circuit 116 to produce a command voltage amplitude $|V_e|$. The space vector transformation circuit 118 uses the command voltage amplitude $|V_c|$ along with a command phase angle $\phi_c$ to generate the reference space vector $V_r^{dq}$, as will be described in greater detail below.

It will be appreciated that although the outer voltage amplitude loop 103 illustrated is preferably used to provide, for example, faster convergence in control of the polyphase AC output at the load 20, the inner voltage loop 101 may be used alone, or other structures may be used to generate the reference space vector $V_r^{dq}$ used as the point input to the inner, space vector domain control loop. For example, in applications, such as motor speed control, the reference space vector $V_r^{dq}$ may be generated by a speed control loop, rather that a voltage amplitude loop.

The inner space vector domain control loop preferably processes the voltage values $V_d$ at a greater rate than the outer loop. For example, in an exemplary 277/480V embodiment, the voltage sensor 300 may sample line-to-neutral voltages at the load 20 at a rate of 50 kHz (one every 20 μsec). The inner control loop may selectively "downsample" (or "decimate") these voltage samples at a rate of 12.5 kHz, generating a new command space vector value every 80 μsec. The outer amplitude control loop may operate at an even slower rate, generating new command voltage amplitude $|V_c|$ values at a rate of 2.5 kHz (once every 400 μsec). It will be appreciated by those skilled in the art, however, that loop processing rates and other control parameters may be varied according to such factors as the nature of the load 20 and the control performance, e.g., transient response, stability, and accuracy, that is desired.

The space vector transformation circuits 102,118, summing circuits 104, 114, compensation circuits 106, 116, and voltage processing circuit 112 are preferably implemented in a digital domain using a data processing device, for example, a microprocessor, microcontroller or digital signal processor (DSP) such as a chip of the TMS320CXX line produced by Texas Instruments. It will be appreciated, however, that these components can, in general, be implemented using other circuitry, such as discrete circuits or integrated circuits such as programmable logic devices (PLDs), application specific integrated circuits (ASICs) or field programmable gate arrays (FPGAs). In addition, although the preferred embodiments illustrated perform control functions in a digital domain, functions of many of the illustrated components can be implemented in the analog domain using analog signal processing circuitry.

Figure 3:
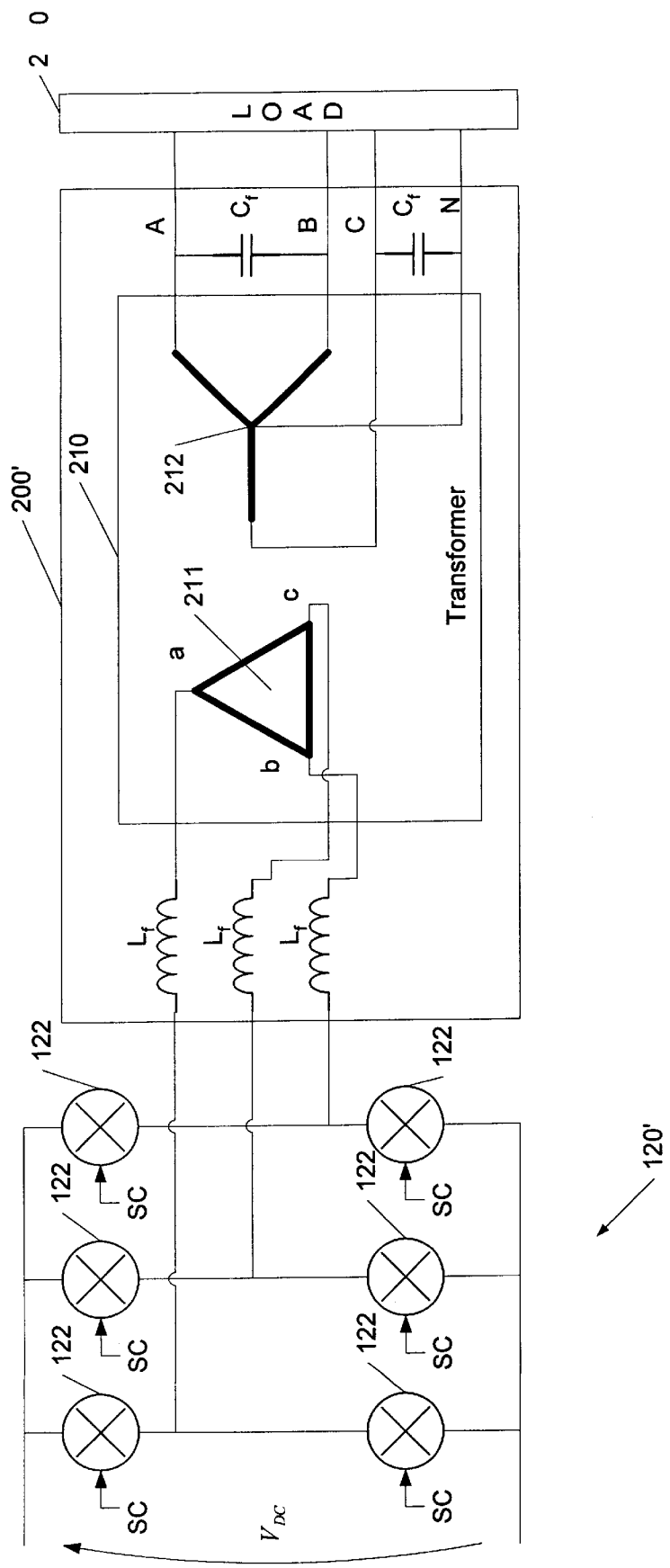
FIG. 3 illustrates a polyphase inverter and output filter according to another embodiment of the present invention.

For the embodiment illustrated in FIG. 1, the polyphase inverter circuit 120 supplies the load 20 via an output filter 200, which may simply be an "LC" low pass filter. However, in an embodiment of the present invention illustrated in FIG. 3, a three-phase, four-wire output (e.g., with an isolated neutral) is produced from a three-phase output. Accordingly, as illustrated in FIG. 3, an output filter 200' may include a "delta-wye" transformer 210 that includes a primary winding 211 with phases a, b, c connected in a delta configuration, inductively coupled to a secondary winding 212 with phases A, B, C connected in a wye configuration. Besides providing a way to create a neutral N, the output filter 200' can help reduce harmonics created by the inverter circuit 120', here shown as including switches 122 connected in a conventional pulse-width modulator (PWM) configuration and responsive to switch command signals SC. Filter inductance Lf may include leakage inductance of the transformer 210 and other inductances connected to the primary and/or secondary windings of the transformer 210. Filter capacitance Cf may be delta-connected, wye-connected, or a combination of both. The switches 122 of the inverter circuit 120' may comprise any of a number of different types of switching devices, such as insulated gate bipolar transistors (IGBTs).

For purposes of the following discussion, it will be assumed that a three-phase "wye" output is to be generated at the load 20 illustrated in FIGS. 2 and 3. The voltage sensor 300 is assumed to sample line-to-neutral voltages at the wye-connected load 20, producing corresponding digital values. The voltage processing circuit 112 of the outer voltage amplitude control loop sums and, preferably, scales and filters, these digital values for presentation to the summing circuit 114. The summing circuit 114 subtracts the value produced by the voltage processing circuit 112 from the reference voltage amplitude $|V_r|$ to produce the voltage amplitude error $|V_e|$. The compensation circuit 116 may implement, for example, a simple proportional integration (PI) compensation scheme to produce the command voltage amplitude $|V_c|$. For example, the compensation circuit 116 may implement an algorithm along the following lines:

$$y_n = y_{n-1} + \alpha^* x_n,$$

where $y_n$ represents the output of the compensation circuit for an nth iteration, $x_n$ represents the input to the compensation circuit for the nth iteration, $y_{n-1}$ denotes the output of the compensation circuit for a preceding n–1th iteration, and $\alpha$ denotes a constant.

The command phase angle $\phi_c$ can be generated in a number of different ways. For example, an analog sine wave generator may be used to generate a reference sine wave from which command phase angles $\phi_c$ can be computed by sampling the reference sine wave and computing the corresponding angle value. This sine wave generator may, for example, be synchronized with a particular phase of an AC source (e.g., a utility source which powers the load 20 under normal conditions), such that the command phase angle $\phi_c$ may be aligned to the AC source. Alternatively, command phase angle values can be synthesized in a digital domain using appropriate computations. These and other techniques for generating a command phase angle $\phi_c$ are well-know to those skilled in the art, and will not be discussed in greater detail herein.

Figure 4:
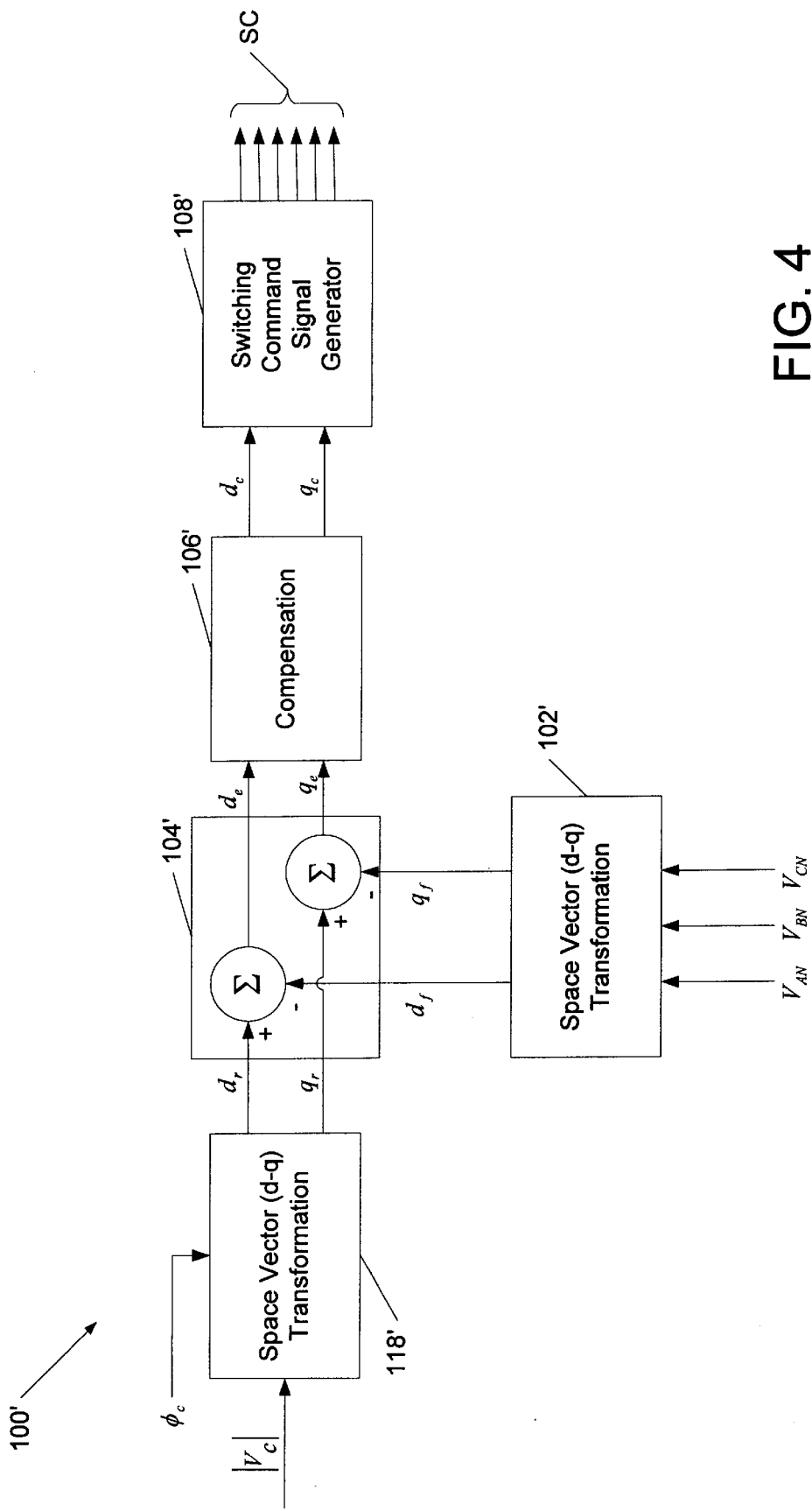
FIG. 4 illustrates a space vector domain controller according to another embodiment of the present invention.

FIG. 4 illustrates exemplary space vector domain control loop components according to an embodiment of the present invention. Referring to FIG. 4 in conjunction with FIG. 2, and assuming the inverter/filter configuration of FIG. 3, the command voltage amplitude $|V_c|$ and the command phase angle $\phi_c$ provide sufficient information from which an appropriate reference space vector $V_r^{dq}$ can be synthesized by the space vector transformation circuit 118'. Using a convention by which the "a" phase voltage $V_a$ generated by the polyphase inverter circuit 120' is aligned with the "d" axis, the components $d_r$, $q_r$ of a reference space vector $V_r^{dq}$ may be generated from the command voltage amplitude $|V_c|$ and the command phase angle $\phi_c$ according to the equations:

$$d_r = \beta |V_c| \cos(\phi_c),$$

and $$q_r = \beta |V_c| \sin(\phi_c),$$

where $\beta$ is a constant.

Due to the effects of the output filter 200', the mapping performed by the space vector transformation circuit 102' is generally more complex. The delta-wye transformation introduced by the transformer 210 can introduce a phase and magnitude transformation. The mapping performed by the space vector transformation circuit 102' should account for this transformation. Assuming that the primary and secondary windings 211, 212 of the transformer 210 have the same number of turns, the transformer 210 produces a phase shift of 30° and a gain of √3 (~1.732) for the secondary line-to-neutral voltages $V_{AN}$, $V_{BN}$, $V_{CN}$ with respect to corresponding ones of the line voltages $V_a$, $V_b$, $V_c$ (where the voltages $V_a$, $V_b$, $V_c$ are with respect to a "virtual neutral" on the primary side). For the illustrated embodiment, the following equations may be used to transform the phase to neutral voltage values $V_{AN}$, $V_{BN}$, $V_{CN}$ into the space vector (d-q) domain components $d_f$, $q_f$ of the output space vector $V_f^{dq}$:

$$d_f = (V_{AN} - V_{BN}) * \frac{\sqrt{3}}{2}, \text{ and}$$

$$q_f = \frac{(V_{AN} - V_{BN})}{2} - V_{CN}.$$

These equations serve to line up the secondary vector with the primary vector for the transformer shown in this embodiment. As will be appreciated by those skilled in the art, the mapping shown uses line to neutral voltage sensing; if the line to line voltages on the secondary side of the transformer 210 are sensed instead, a different mapping set of equations would be used. Similarly, if the transformer 210 is not present, e.g., if the load is connected directly to the inverter circuit 120' and the line-to-line voltages sensed at this point, a different space vector transformation would be used.

Components $d_e$, $q_e$ of the error space vector $V_e^{dq}$ are generated by subtracting respective ones of the feedback components $d_f$, $q_f$ from respective ones of the reference space vector components $d_r$, $q_r$. The error space vector components $d_e$, $q_e$ are then compensated by processing them in a compensation circuit 106' (e.g., according to a digital compensation algorithm) to produce components $d_c$, $q_c$ of the command space vector $V_c^{dq}$. The compensation preferably compensates for characteristics of the output filter 200'. The compensate may also compensate for known or estimated characteristics of the load 20. Examples of DSP-based control algorithms are described, for example, in *Digital Control System Analysis and Design* by C. L. Phillips and H. T. Nagle, $2^{nd}$ ed. (1990). Modeling and testing of such algorithms can be easily done using a software tool such as P-Sim, produced by Power Sim of Vancouver, BC.

For the embodiment illustrated in FIG. 3, in which an output filter 200' is provided, the space vector compensation implemented by the compensation circuit 106' preferably compensates for a complex pole introduced by the output filter 200'. For example, for a complex pole at 811 Hz, the following algorithm can be used at a sampling rate of 12.5 kHz (80 μsec) to provide modest gain and dampen the complex pole:

$$y_{c_n} = 6.0*(0.256*x_{e_n} - 0.449*x_{e_{n-1}} + 0.229*x_{e_{n-2}}) - 0.395*y_{c_{n-1}} + 0.461*y_{c_{n-2}}$$

where $x_e$ is one of the d or q error space vector components $d_e$, $q_e$, $y_c$ is a corresponding one of the d or q components $d_c$, $q_c$ of the command space vector $V_c^{dq}$, and the subscripts n, n-1, and n-2 refer to an nth iteration and preceding n-1th and n-2th iterations. The coefficients of this algorithm can be adaptively changed, for example, if the pole shifts or otherwise changes due to load or other parametric changes.

Still referring to FIG. 4, the components $d_c$, $q_c$ of the command space vector $V_c^{dq}$ are passed to a switching command signal generator 108', which implements a space vector modulation (SVM) scheme to generate switching command signals SC that operate switches of a polyphase inverter circuit, such as the switches 122 of the polyphase inverter circuit 120' of FIG. 3. Potential advantages of SVM include ease of implementation with a microcontroller, DSP or other processor, and ease in implementing a discontinuous PWM (DPWM) strategy. DPWM has two potential advantages: (1) it can reduce switching losses; and (2) it can deliver increased voltage through overmodulation. Referring to the PWM inverter circuit 120' illustrated in FIG. 3, in a discontinuous modulation scheme, one of the switches in a leg of the circuit is left "on" for 60 electrical degrees, while the other switch in the leg remains "off" during the same 60-degree period. Each of these 60-degree periods is referred to as a "sector".

Discontinuous operation in a six-switch, three-phase inverter, such as that illustrated in FIG. 3, typically requires that a "positive" switching device, i.e., a switching device that couples its corresponding phase conductor to the positive DC rail, have its 60 degrees of operation when the voltage on its corresponding phase conductor is higher than the voltages on the other two phase conductors. Likewise, a "negative device," i.e., a device that couples its corresponding phase conductor to the negative DC rail, typically must have its 60 degrees of discontinuous operation when the voltage on its corresponding phase conductor is less (more negative) than the voltages on the other two phase conductors. Consequently, this constrains the 60-degree period of a given switch to fall within a 120-degree window.

Accordingly, the sector location of the dq command space vector $V_c^{dq}$ can be used by switching command signal generating circuit 108' to determine the appropriate switching command signals SC to operate of switches of a polyphase inverter circuit. Several different types of SVM techniques can be utilized, each of which may provide different distortion, switching loss and other operating characteristics. For example, various ones of the SVM schemes described in van der Broeck et al., "Analysis and Realization of a Pulse Width Modulator Based on Voltage Space Vectors," IEEE Transactions on Industrial Applications, vol. 24, no. 1, pp. 142–150 (February 1998), Holtz, "Pulsewidth Modulation—A Survey," IEEE Transactions on Industrial Electronics, vol. 39, no. 5, pp. 410–420, and in Stefanovic et al., "Space Vector PWM Voltage Control with Optimized Switching Strategy," IEEE IAS-1992 Annual Meeting, pp. 1025–1033 (1992) may be used with the present invention.

Figure 5A:
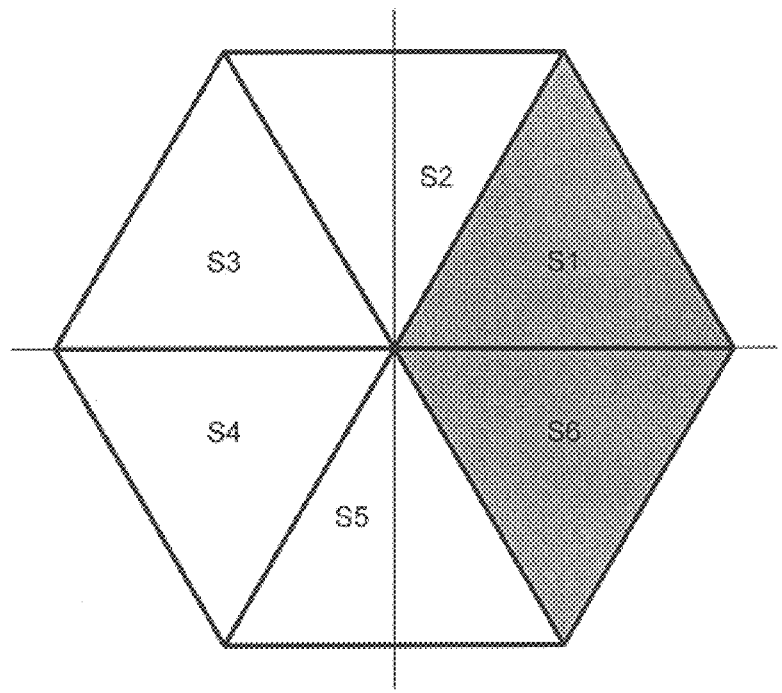
FIGS. 5A–5B illustrate exemplary space vector modulation (SVM) operations.
Figure 5B:
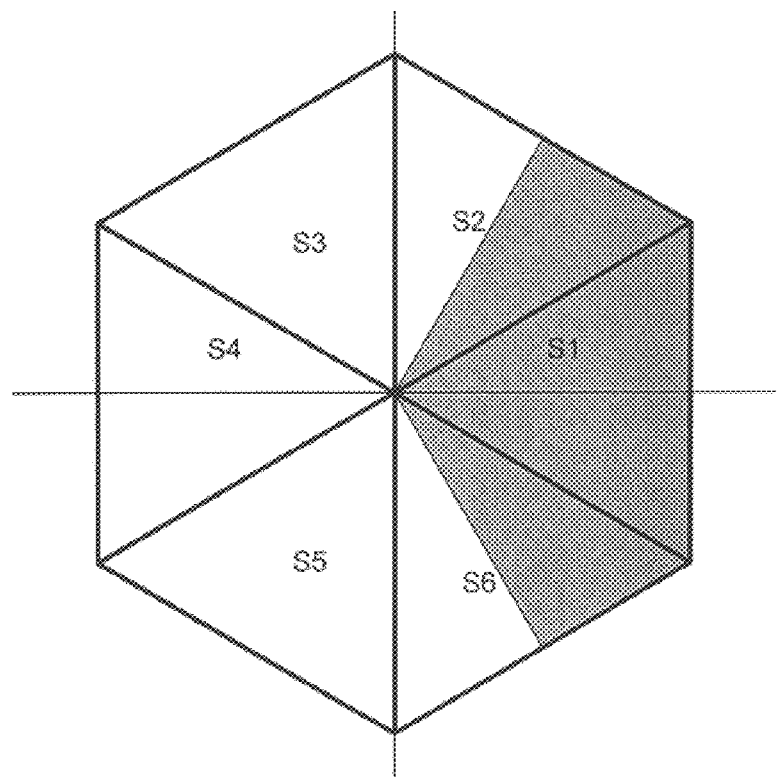

The aforementioned paper by Hava et al entitled "Carrier-Based PWM-VSI Overmodulation Strategies: Analysis, Comparison and Design" compares overmodulation SVM schemes, including schemes referred to a "Depenbrock" and "Ogasawara" schemes, which may be used with the present invention, and which are conceptually illustrated in FIGS. 5A and 5B, respectively. In FIGS. 5A and 5B, a six sector map overlays the d-q axis, with each sector comprising 60 degrees. In a first sector S1, phase "a" is coupled to positive DC rail; in a second sector S2, phase "c" is held to the negative DC rail; in a third sector S3, phase "b" is held to the positive DC rail; in a fourth sector S4, phase "a" is held to the negative DC rail; in a fifth sector S5, phase "c" is held to the positive DC rail; and in a sixth sector S6, phase "b" is held to the negative DC rail. With the sectors as such, and adhering to the convention that phase "a" is aligned with the "d" axis, the shaded areas of FIGs. SA and SB indicate allowable areas for which sector 1 operation can occur under the respective Depenbrock and Ogasawara techniques. A conventional technique for determining which sector the command space vector lies utilizes a sine look-up table. It is noted here that if the Ogasawara method is used, a phase shift caused by "closing the loop" may push the sector beyond its allowable 120-degree window.

An embodiment of the present invention uses an Ogasawara scheme and solves this problem by determining the sector after the d-q compensation. According to this embodiment of the present invention, the appropriate PWM operational sector for given d-q command space vector may be determined by the following pseudocode, where the variables SpaceVectorIndex_D and SpaceVectorIndex_Q denote the d and q components $d_c$, $q_c$, respectively, of the command space vector $V_c^{dq}$:

```
TEST D-Q QUADRANT, THEN DETERMINE PWM INDEX
SECTOR:
CHECK QUAD 2:
    IF SpaceVectorIndex_D <=0
    AND SpaceVectorIndex_Q > 0
    THEN in QUAD 2
        IF SpaceVectorIndex_Q/2 + 0.866*SpaceVectorIndex_D < 0
        THEN in Sector 3
        ELSE in Sector 2
CHECK QUAD 3:
    IF SpaceVectorIndex_D <=0
    AND SpaceVectorIndex_Q <=0
    THEN in QUAD 3
        IF SpaceVectorIndex_Q/2 - 0.866*SpaceVectorIndex_D < 0
        THEN in Sector 5
        ELSE in Sector 4
CHECK QUAD 1:
    IF SpaceVectorIndex_D > 0
    AND SpaceVectorIndex_Q > 0
    THEN in QUAD 1
        IF SpaceVectorIndex_Q/2 - 0.866*SpaceVectorIndex_D < 0
        THEN in Sector 1
        ELSE in Sector 2
CHECK QUAD 4:
    IF SpaceVectorIndex_D > 0
    AND SpaceVectorIndex_Q <=0
    THEN in QUAD 4
        IF SpaceVectorIndex_Q/2 + 0.866*SpaceVectorIndex_D < 0
        THEN in Sector 5
        ELSE in Sector 6
IF SpaceVectorIndex_D <= 0
        X1 = ABS(X1)
        IF SpaceVectorIndex_Q > 0
            If ((SpaceVectorIndex_Q/2) - X1) <=0)
                INDEX SECTOR = 3
            ELSE
                INDEX SECTOR = 2
        ELSE IF ABS[SpaceVectorIndex_Q/2] - X1 <= 0
                INDEX SECTOR = 4
        ELSE
                INDEX SECTOR = 5
ELSE IF SpaceVectorIndex_Q > 0
        IF (SpaceVectorIndex_Q/2 - X1) <= 0)
                INDEX SECTOR = 1
        ELSE
                INDEX SECTOR = 2
ELSE IF (ABS[SpaceVectorIndex_Q/2] - X1 <= 0)
                INDEX SECTOR 6
        ELSE
                INDEX SECTOR 5
```

It will be appreciated that the above-described pseudocode implementation is offered for exemplary purposes, and that other techniques may be used with the present invention. For example, other techniques for implementing an Ogasawara scheme can be used, as well as techniques that implement other SVM schemes, such as Depenbrock schemes.

Referring to FIGS. 2–4, a DC voltage may arise in the output produced by the polyphase inverter circuit 120, 120' due to offset voltages of amplifiers used in the voltage sensor 300 and/or numeric underflow in processing in the control loop components of the space vector domain controller 100, 100'. This DC voltage can cause potentially destructive currents to flow in the primary winding 211 of the transformer 210. According to an embodiment of the present invention, this DC voltage can be reduced by inclusion of a high pass filter in the compensation circuit 106, 106' applied in the space vector domain controller 100, 100'. As with the other compensation, this high pass filter is preferably implemented in a digital domain using a microcontroller, DSP or similar computing devices, but can be implemented using other digital or analog circuitry. An exemplary algorithm for implementing such a high pass filter is given by:

$$y_n = x_n - x_{n-1} + \gamma^* y_{n-1},$$

where $x_n$ represents an input "d" or "q" component value for an nth iteration, $y_n$ represents a d or q component of the filter output for the nth iteration, $x_{n-1}$ represents an input d or q component value for a preceding n−1th iteration, $y_{n-1}$ represents a d or q component of the filter output for the n−1th iteration, and $\gamma$ is a constant.

Figure 6:
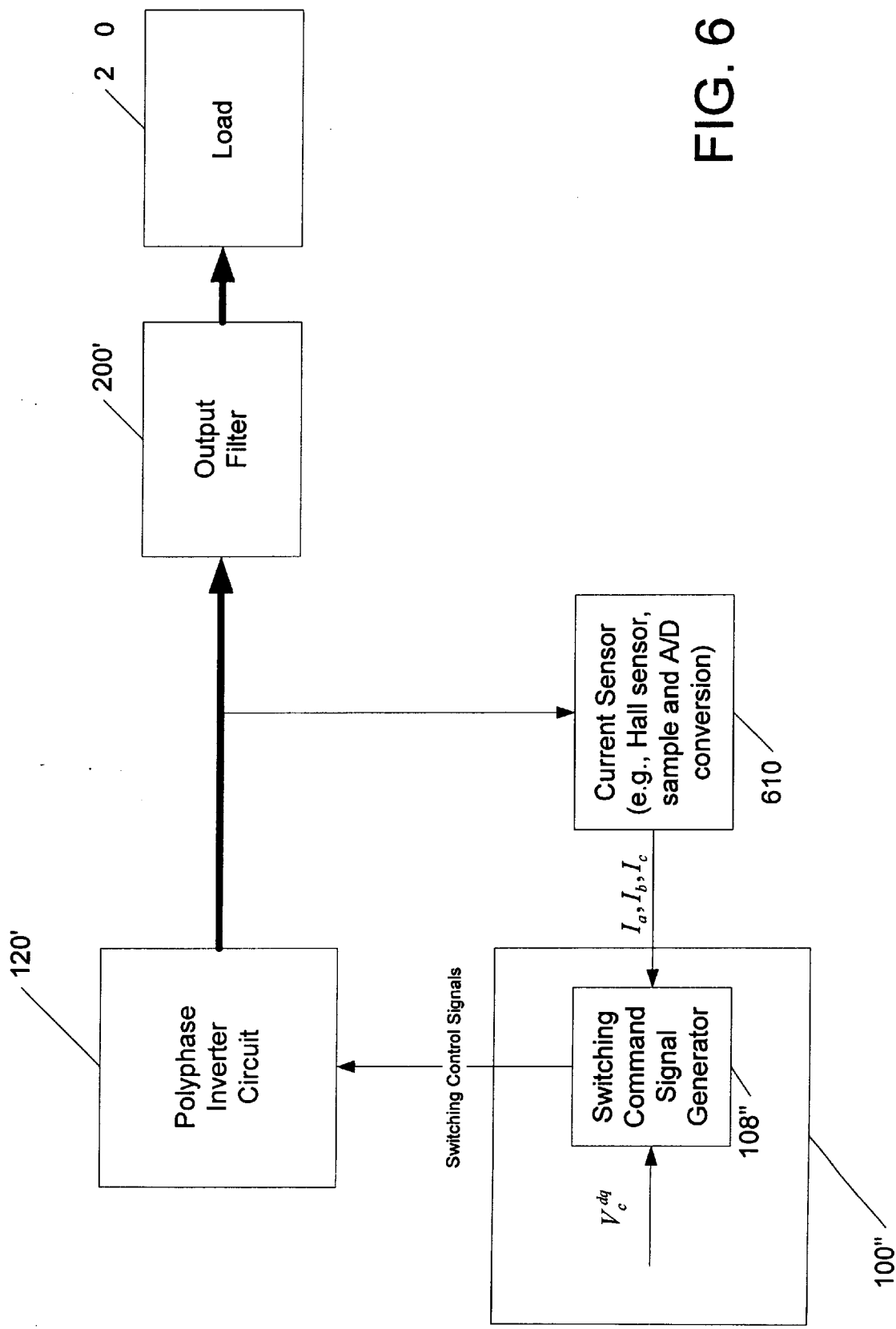
FIG. 6 illustrates output current control according to yet another embodiment of the present invention.

A UPS often needs to handle excessive overloads or faults on its output while remaining operational. A conventional technique for dealing with such an event is to add analog circuitry in the signal flow path that takes autonomous protective action in response to such an event. According to another aspect of the present invention, protective capability may be combined with the voltage control described above. Referring to FIG. 6, a switching command signal generation circuit 108" that performs space vector modulation functions responsive to a command voltage $V_c^{dq}$ (e.g., as described with reference to FIG. 4) is also responsive to current values $I_a$, $I_b$, Ib acquired by a current sensor 610 to limit the currents generated by the polyphase inverter circuit, where the current values $I_a$, $I_b$, $I_b$ correspond to currents in the phases a, b, c supplied by the polyphase inverter circuit 120'. To implement a current limit, for example, the switching command signal generator circuit 108" may compare the sensed current values $I_a$, $I_b$, $I_b$ with a maximum value, and may act to shut down selected switches in the polyphase inverter circuit 120' if one or more of the sensed currents $I_a$, $I_b$, $I_b$ exceeds the maximum value. The acquisition and comparison of the sensed currents $I_a$, $I_b$, $I_b$ can be done at higher rates than the voltage control loops (e.g., every 20 μsec) to accomplish an effective "current limit".

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An uninterruptible power supply (UPS) for supplying a polyphase AC output at a load, the UPS comprising:
   a DC voltage generator that produces a DC voltage;
   a voltage sensor, configured to connect to the load, that detects a plurality of output voltages at the load; and
   a space vector domain controlled inverter, coupled to said voltage sensor and to said DC voltage generator and configured to connect to the load, that transforms the detected plurality of output voltages according to a space vector transformation to generate an output space vector corresponding to the detected plurality of output voltages, that generates an error space vector from the output space vector and a reference space vector, and that selectively couples said DC voltage generator to the load responsive to the error space vector.

2. A UPS according to claim 1, wherein said space domain controlled inverter comprises:

a space vector domain controller, coupled to said voltage sensor, that transforms the detected plurality of output voltages according to a space vector transformation to estimate an output space vector corresponding to the detected plurality of output voltages, that generates an error space vector from the output space vector and a reference space vector, and that generates a switching command signal responsive to the error space vector; and a polyphase inverter circuit, coupled to said space vector domain controller and to said DC voltage generator and configured to connect to the load, that selectively couples said DC voltage generator to the load responsive to the generated switching command signal.

3. A UPS according to claim 2, wherein said space vector domain controller compensates the error space vector to generate a command space vector and generates the switching command signal responsive to the command space vector.

4. A UPS according to claim 3, further comprising an output filter configured to couple said polyphase inverter circuit to the load.

5. A UPS according to claim 3, further comprising a transformer having first winding connected to the polyphase inverter circuit and a second winding configured to connect to the load, and:

wherein said voltage sensor detects a plurality of voltages produced at the second winding of the transformer;

wherein said space vector domain controller transforms the detected plurality of output voltages produced at the second winding of the transformer according to a space vector transformation that compensates for at least one of a phase and magnitude transformation imposed by the transformer; and wherein said polyphase inverter circuit is operative to selectively couple said DC voltage generator to the primary winding of the transformer responsive to the switching command signal generated by said space vector domain controller.

6. A UPS according to claim 3:

wherein said voltage sensor generates a plurality of digital voltage values; and wherein said space vector domain controller computes a digital output space vector from the plurality of digital voltage values according to the space vector transformation, computes a digital error space vector from the digital output space vector and a digital reference space vector, computes a digital command space vector from the digital error space vector according to a compensation algorithm, and processes the digital command space vector to generate the switching command signal.

7. A UPS according to claim 3, further comprising a current sensor that detects a current produced by said polyphase inverter circuit, and wherein said space vector domain controller limits current produced by the polyphase inverter circuit responsive to the detected current.

8. A UPS according to claim 3, wherein said space vector domain controller high-pass filters the error vector to produce the command space vector.

9. A UPS according to claim 1, wherein the plurality of output voltages comprises a plurality of phase-to-neutral voltages.

10. A UPS according to claim 1:

wherein said space vector domain controller transforms the detected plurality of output voltages according to a first space vector transformation; and wherein said space vector domain controller generates a voltage amplitude error from the detected plurality of output voltages and a reference voltage amplitude, compensates the voltage amplitude error to produce a command voltage amplitude and transforms the command voltage amplitude according to a second space vector transformation to produce the reference space vector.

11. A UPS according to claim 10, wherein said space vector domain controller sums the detected plurality of output voltages to produce an output voltage amplitude and subtracts the output voltage amplitude from the reference voltage amplitude to generate the voltage amplitude error.

12. A power converter for supplying a polyphase AC output at a load from a DC source, the power converter comprising:

a voltage sensor, configured to connect to the load, that detects a plurality of output voltages at the load;

a space vector domain controlled inverter, coupled to said voltage sensor and configured to connect to the DC source and the load, that transforms the detected plurality of output voltages according to a space vector transformation to estimate an output space vector corresponding to the detected plurality of output voltages, that generates an error space vector from the output space vector and a reference space vector, and that selectively couples the DC source to the load responsive to the error space vector.

13. A power converter according to claim 12, wherein said space domain controlled inverter comprises:

a space vector domain controller, coupled to said voltage sensor, that transforms the detected plurality of output voltages according to a space vector transformation to estimate an output space vector corresponding to the detected plurality of output voltages, that generates an error space vector from the output space vector and a reference space vector, and that generates a switching command signal responsive to the error space vector; and a polyphase inverter circuit, coupled to said space vector domain controller and configured to connect to the DC source and to the load, that selectively couples the DC source to the load responsive to the generated switching command signal.

14. A power converter according to claim 13, wherein said space vector domain controller compensates the error space vector to generate a command space vector and generates the switching command signal responsive to the command space vector.

15. A power converter according to claim 14, further comprising an output filter configured to couple said polyphase inverter circuit to the load.

16. A power converter according to claim 14, further comprising a transformer having first winding connected to the polyphase inverter circuit and a second winding configured to connect to the load, and:

wherein said voltage sensor detects a plurality of voltages produced at the second winding of the transformer;

wherein said space vector domain controller transforms the detected plurality of output voltages produced at the second winding of the transformer according to a space vector transformation that compensates for at least one of a phase and magnitude transformation imposed by the transformer; and wherein said polyphase inverter circuit is operative to selectively couple the DC source to the primary winding of the transformer responsive to the switching command signal generated by said space vector domain controller.

17. A power converter according to claim 14:

wherein said voltage sensor generates a plurality of digital voltage values; and wherein said space vector domain controller computes a digital output space vector from the plurality of digital voltage values according to the space vector transformation, computes a digital error space vector from the digital output space vector and a digital reference space vector, computes a digital command space vector from the digital error space vector according to a compensation algorithm, and processes the digital command space vector to generate the switching command signal.

18. A power converter according to claim 14, further comprising a current sensor that detects a current produced by said polyphase inverter circuit, and wherein said space vector domain controller limits current produced by the polyphase inverter circuit responsive to the detected current.

19. A power converter according to claim 14, wherein said space vector domain controller high-pass filters the error vector to produce the command space vector.

20. A power converter according to claim 12, wherein the plurality of output voltages comprises a plurality of phase-to-neutral voltages.

21. A power converter according to claim 12:

wherein said space vector domain controller transforms the detected plurality of output voltages according to a first space vector transformation; and wherein said space vector domain controller generates a voltage amplitude error from the detected plurality of output voltages and a reference voltage amplitude, compensates the voltage amplitude error to produce a command voltage amplitude and transforms the command voltage amplitude according to a second space vector transformation to produce the reference space vector.

22. A power converter according to claim 21, wherein said space vector domain controller sums the detected plurality of output voltages to produce an output voltage amplitude and subtracts the output voltage amplitude from the reference voltage amplitude to generate the voltage amplitude error.

23. A method of regulating voltage at a polyphase AC load, the method comprising the steps of:

detecting a plurality of output voltages at the load;

transforming the detected plurality of output voltages according to a space vector transformation to estimate an output space vector corresponding to the detected plurality of output voltages;

generating an error space vector from the output space vector and a reference space vector; and selectively coupling a DC source to the load responsive to the error space vector.

24. A method according to claim 23, wherein said step of selectively coupling a DC source to the load comprises the steps of:

compensating the error space vector to generate a command space vector; and selectively coupling the DC source to the load responsive to the command space vector.

25. A method according to claim 24, wherein said step of selectively coupling comprises the step of operating switches of a polyphase inverter circuit that is operative to selectively couple the DC source to the load responsive to the command space vector.

26. A method according to claim 25:

wherein the polyphase inverter circuit is connected to the load through a transformer having first winding connected to the polyphase inverter circuit and a second winding connected to the load;

wherein said step of detecting a plurality of output voltages at the load comprises the step of detecting a plurality of voltages produced at the second winding of the transformer;

wherein said step of transforming the detected plurality of voltages comprises the step of transforming the detected plurality of output voltages produced at the second winding of the transformer according to a space vector transformation that compensates for at least one of a phase and magnitude transformation imposed by the transformer; and wherein said step of operating switches of the polyphase inverter circuit comprises the step of operating switches of the polyphase inverter circuit responsive to the command space vector to selectively couple the DC source to the primary winding of the transformer.

27. A method according to claim 25:

wherein said step of detecting a plurality of output voltages comprises the steps of:
sampling a plurality of voltages at the load; and
generating a plurality of digital voltage values from the sampled plurality of voltages;

wherein said step of transforming the detected plurality of output voltages comprises the step of computing a digital output space vector from the plurality of digital voltage values according to the space vector transformation;

wherein said step of generating an error vector comprises the step of computing a digital error space vector from the digital output space vector an a digital reference space vector;

wherein said step of compensating the error space vector comprises the step of computing a digital command space vector from the digital error space vector according to a compensation algorithm; and wherein said step of selectively coupling the DC source to the load responsive to the command space vector comprises the step of processing the digital command space vector to determine switching commands for the polyphase inverter circuit.

28. A method according to claim 25, further comprising the steps of:

detecting a current produced by the polyphase inverter circuit; and limiting current produced by the polyphase inverter circuit responsive to the detected current.

29. A method according to claim 24, wherein said step of compensating comprises the step of high-pass filtering the error vector.

30. A method according to claim 23, wherein said plurality of output voltages comprises a plurality of phase-to-neutral voltages.

31. A method according to claim 23:
wherein said step of transforming the detected plurality of output voltages according to a space vector transformation comprises the step of transforming the detected plurality of output voltages according to a first space vector transformation; and
wherein the method further comprises the steps of:
generating a voltage amplitude error from the detected plurality of output voltages and a reference voltage amplitude;
compensating the voltage amplitude error to produce a command voltage amplitude; and
transforming the command voltage amplitude according to a second space vector transformation to produce the reference space vector.

32. A method according to claim 31, wherein said step of generating a voltage error comprises the steps of:
summing the detected plurality of output voltages to produce an output voltage amplitude; and
subtracting the output voltage amplitude from the reference voltage amplitude to generate the voltage amplitude error.

* * * * *